United States Patent
Rangan et al.

(10) Patent No.: US 6,198,833 B1
(45) Date of Patent: Mar. 6, 2001

(54) ENHANCED INTERACTIVE VIDEO WITH OBJECT TRACKING AND HYPERLINKING

(75) Inventors: P. Venkat Rangan, San Diego; Mehul Shah, Del Mar; Vijnan Shastri, San Diego, all of CA (US)

(73) Assignee: HoTV, Inc., San Diego, CA (US)

( * ) Notice: Subject to any disclaimer, the term of this patent is extended or adjusted under 35 U.S.C. 154(b) by 0 days.

(21) Appl. No.: 09/154,532

(22) Filed: Sep. 16, 1998

(51) Int. Cl.$^7$ .................................................. G06K 9/00
(52) U.S. Cl. .................................................. 382/103
(58) Field of Search .................................. 382/103, 107, 382/166, 236, 288; 348/349, 352; 345/326, 327, 328, 333, 334, 335, 146, 157, 962

(56) References Cited

U.S. PATENT DOCUMENTS 5,912,980 * 6/1999 Hunke .................................... 382/103
5,933,535 * 8/1999 Lee et al. ............................... 382/243

* cited by examiner

*Primary Examiner*—Andrew W. Johns
*Assistant Examiner*—Shervin Nakhjavan
(74) *Attorney, Agent, or Firm*—Donald R. Boys; Central Coast Patent Agency

(57) ABSTRACT

A tracking software module for tracking a moving image entity in a video display has an interface for receiving and processing a video data stream while the video presentation provided by the data stream is presented on a display as a series of bitmapped images having a moving image entity to be tracked. There is in the module a graphical user interface usable by an editor for creating, selecting and centering a predefined matrix of signature pixel positions on the moving entity to be tracked in a first frame of the video presentation, and for initiating a tracking process. A determination function determines the color values of the signature pixels in the first frame and stores the values as an image signature. An estimation function assumes a next position for the moving entity, and a test function determines the color signature of the signature pixels at the assumed position and at a plurality of test positions in the immediate vicinity of the assumed position and tests the determined values against the color signature recorded for the entity. Finally a recording function accepts the position wherein the pixel signature most closely matches the image signature; in each frame, and a data stream synchronous with the input data stream and having centerpoint coordinates frame-by-frame for the moving entity is provided as a result.

17 Claims, 6 Drawing Sheets

ENHANCED INTERACTIVE VIDEO WITH OBJECT TRACKING AND HYPERLINKING

FIELD OF THE INVENTION

The present invention is in the field of video broadcasting and editing and pertains more particularly to methods and apparatus for tracking an image entity within a presented or broadcast video and associating that entity with useful additional data.

BACKGROUND OF THE INVENTION

With continuing development of new and better ways of delivering television and other video presentations to end users, and parallel development of computerized information systems, such as the Internet and the associated World Wide Web (WWW), there have been concerted efforts to integrate various systems to provide enhanced information delivery and entertainment systems. For example, developers are introducing integrated systems combining TVs with computer subsystems, so a TV may be used as a WEB browser, or a PC may be used for enhanced TV viewing.

In some systems computer elements, such as a CPU, memory, and the like, are built into the familiar chassis of a TV set. In such a system, the TV screen becomes the display monitor in the computer mode. In such a system, conventional TV elements and circuitry are incorporated along with the computer elements, and capability is provided for a user to switch modes, or to view recorded or broadcast video with added computer interaction. One may thus, with a properly equipped system, select to view analog TV programs, digital TV programs, conventional cable TV, satellite TV, pay TV from various sources, and browse the WWW as well, displaying WEB pages and interacting with on-screen fields and relational systems for jumping to related information, databases, and other WEB pages. The capabilities are often integrated into a single display, that is, one may view a broadcast presentation and also have a window on the display for WEB interaction.

In some other systems, computer elements are provided in an enclosure separate from the TV, often referred to in the art as a set-top box. Set-top box systems have an advantage for providers in that they may be connected to conventional television sets, so end users don't have to buy a new TV along with the computer elements.

In such integrated systems, whether in a single enclosure or as set-top box systems, user input is typically through a hand-held device quite similar to a familiar remote controller, usually having infra-red communication with the set-top box or a receiver in the integrated TV. For computer modes, such as WEB browsing, a cursor is displayed on the TV screen, and cursor manipulation is provided by buttons or other familiar pointer apparatus on the remote. Select buttons are also provided in the remote to perform the familiar function of such buttons on a pointer device, like a mouse or trackball more familiar to computer users.

Set-top boxes and computer-integrated TVs adapted as described above typically have inputs for such as a TV antenna (analog), cable TV (analog or digital), more recently direct-satellite TV (digital), and may also connect to video cassette recorders and to mass storage devices such as hard disk drives and CD-ROM drives to provide a capability for uploading video data from such devices and presenting the dynamic result as a display on the TV screen.

The present inventors have noted that with the coupling of computer technology with TV, many capabilities familiar to computer users have been made available to TV users. For example, ability to provide text annotation for TV presentations is considerably enhanced. Computer techniques such a Pix-on-Pix are now available, wherein separate TV presentations may be made in separate windows, or overlaid windows on the display screen. Separate windows may also support display from separate sources, such as an analog TV program in one window, a computer game in another, and a video conference in a third.

With the technologies described above becoming more available in the market place, it has become desirable to further integrate the technologies described so that a user viewing a video presentation might be enabled to gather additional information about a specific image entity or entities portrayed in a video through interactive method. An ultimate goal and potential use of the technology is to provide a means for advertisers to promote and sell products through user interaction in a way that minimizes steps required by such a user to access additional information regarding traditionally advertised products such as through commercials and the like. Another potential use is to provide additional information about the entity, for example, if the image entity is a race car the additional information can be the speed of the car tracked, and so on.

What is clearly needed is a method and apparatus for tracking image entities within a dynamic video display for supplying such tracking data so as to enable the image entity or entities to be identifiable and user-interaction-capable to end users wherein upon interaction, additional data regarding the image entity may be presented to the user. Such a method and apparatus would provide advertisers with a new venue for promoting their products and services and limit steps required by consumers interested in finding out more about products in which they might be interested.

SUMMARY OF THE INVENTION

Inn a preferred embodiment of the present invention a method for tracking a moving entity in a video presentation is provided, comprising steps of (a) centering a tracking element on the entity in a first frame of a video display comprising a series of bitmapped frames, generating a matrix of signature pixels relative to the tracking entity, and initiating a tracking process; (b) recording the color values of each of the signature pixels in the first frame, creating thereby a color signature for the entity; (c) obtaining a next frame of the video presentation; (d) assuming a position for the entity in the next frame; (e) testing the color signature at the assumed position and at a plurality of test positions in the immediate vicinity of the assumed position against the color signature recorded for the entity; (f) accepting the position with the closest match to the color signature for the entity as the correct position for the entity; and (g) repeating steps (c) through (f) to determine positions for the entity in succeeding frames of the video presentation.

In some embodiments the matrix of signature pixels is pre-defined, and associated with a tracking element of a predefined shape and size relative to the video display, and there may be a plurality of tracking elements of different shapes and sizes available for selection for association with an entity to be tracked. Also in preferred embodiments the number of pixels in the predefined matrix of pixels for the plurality of tracking elements available for selection remains substantially the same, but the matrix, including relative distribution of the signature pixels in the tracking element, may be different.

In the method, in step (a), there may be substeps of selecting one of the plurality of tracking elements by cursor technique using a pointer device, moving the selected tracking element over the entity to be tracked by drag-and-drop technique, and initiating the tracking process by an incremental input by the user. The color values for the signature pixels are placed in an organized table for comparison with later assumed color signatures.

In a preferred embodiment there is a difference in assuming a next position in a second frame as opposed to assuming a new position is successive frames. In the second frame there is no history of movement, so no movement is assumed, and color signatures are tested in a plurality of positions in the immediate vicinity of the original position to determine first movement. In third and succeeding frames, the assumed position is determined by applying a movement vector from the next-to-last preceding frame processed to the last preceding frame processed.

There are a number of ways for testing for deviation from assumed new position, and, in one embodiment the plurality of test positions in the immediate vicinity of the assumed position is a series of positions in a spiral pattern processing from the center point of the assumed position. As the image entity is tracked the determined center positions of the tracked image entity are provided as a data stream synchronous with the video data stream of the video presentation.

In another aspect of the invention a system is provided for tracking a moving entity in a video presentation, the system comprising a computer station presenting the video presentation on a display as a series of bitmapped frames; and a tracking module receiving the video data stream, the tracking module comprising a graphical user interface usable by an editor for selecting and centering a tracking element on the moving entity to be tracked in a first frame of the video presentation, and initiating a tracking process; a matrix generation function for generating a matrix of signature pixels relative to the tracking element; a determination function for determining the color values of the signature pixels in the first frame and storing the values as an image signature; an estimation function for assuming next positions for the moving entity; a test function for determining the color signature of the signature pixels at the assumed positions and at a plurality of test positions in the immediate vicinity of the assumed positions against the image signature recorded for the entity; and a recording function for accepting the positions wherein the pixel signature most closely matches the image signature as the true positions of the image entity in the next frames. The graphical user interface provides a selection of tracking elements of different size and shape relative to the video display for the editor to select, and as tracking elements are used a matrix of signature pixels is created relative to the tracking element used. The number of pixels in the predefined matrix of pixels for each of tracking elements available for selection remains substantially the same, but the matrix, including relative distribution in the tracking element, may be different.

In some embodiments, in the graphical user interface, the editor selects one of the plurality of tracking elements by cursor technique using a pointer device, moves the selected tracking element over the entity to be tracked by drag-and-drop technique, and initiates the tracking process by an incremental input at the pointer device. In the determination function in this embodiment color values for the signature pixels are placed in an organized table for comparison with later assumed color signatures.

In the estimation function, for the second frame the assumed position for the entity is typically the same position as in the first frame, whereas, in third and succeeding frames the assumed position is determined by applying a movement vector from the next-to-last preceding frame processed to the last preceding frame processed. In one embodiment the test function the plurality of test positions in the immediate vicinity of the assumed position is a series of positions in a spiral pattern processing from the center point of the assumed position. In the same embodiment, in the recording function, the determined center positions of the tracked image entity are provided as a video stream synchronous with the video data stream of the video presentation.

In yet another aspect of the invention a tracking software module is provided comprising an interface for receiving and processing a video data stream while the video presentation provided by the data stream is presented on a display as a series of bitmapped images having a moving image entity to be tracked; a graphical user interface usable by an editor for creating or selecting and then centering a tracking element on the moving entity to be tracked in a first frame of the video presentation, and for initiating a tracking process; a matrix generation function for generating a matrix of signature pixels relative to the tracking element; a determination function for determining the color values of the signature pixels in the first frame and storing the values as an image signature; an estimation function for assuming a next position for the moving entity; a test function for determining the color signature of the signature pixels at the assumed position and at a plurality of test positions in the immediate vicinity of the assumed position and testing the determined values against the color signature recorded for the entity; a recording function for accepting the position wherein the pixel signature most closely matches the image signature; and an output interface for providing a data stream synchronous with the input data stream and having centerpoint coordinates frame-by-frame for the moving entity.

In the various aspects of the invention for the first time in the art an automatic facility is provided for tracking moving entities in video presentations wherein the video presentations are presented at real-time speeds., so associations may be made with such entities by end users in integrated computerized video presentation systems. These and other aspects are taught in enabling detail below.

BRIEF DESCRIPTION OF THE DRAWING FIGURES

DESCRIPTION OF THE PREFERRED EMBODIMENTS

Figure 1:
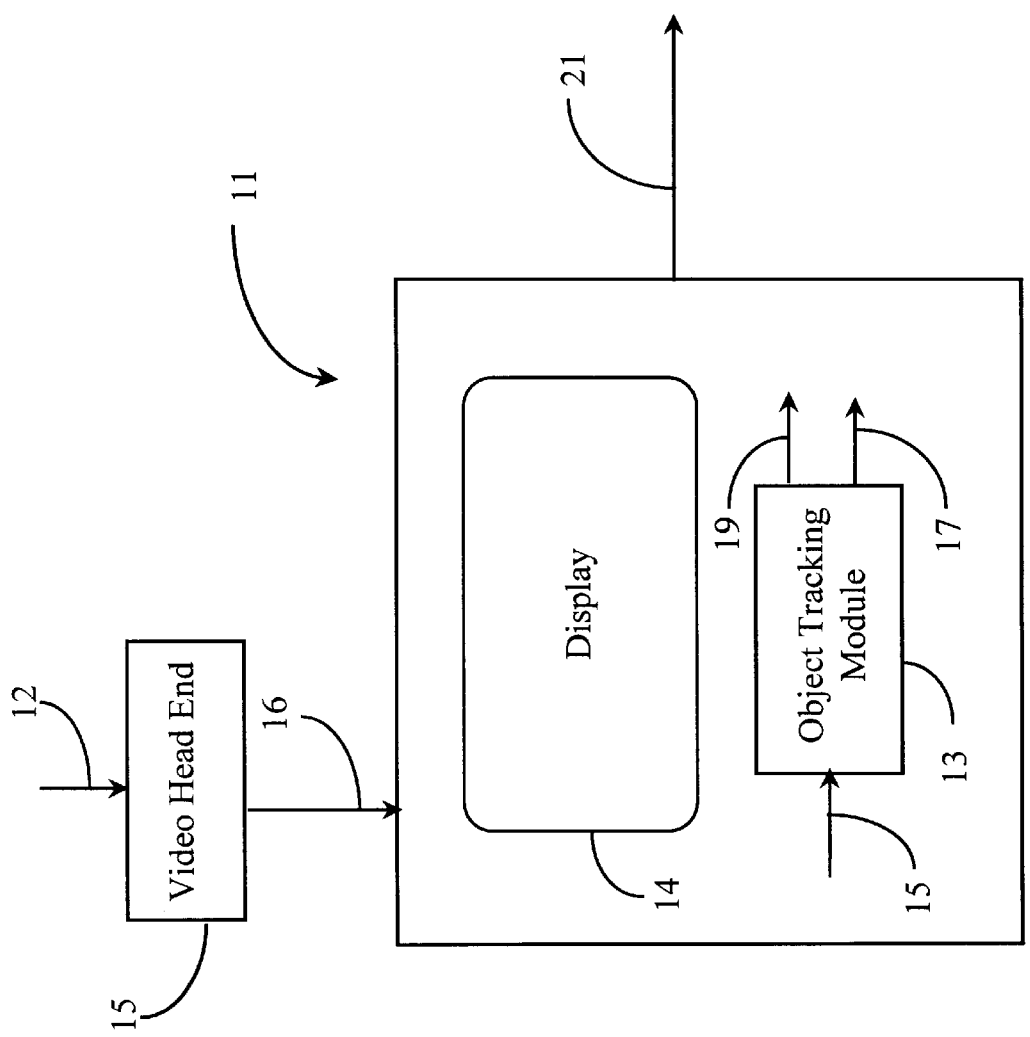
FIG. 1 is a block diagram illustrating an authoring system incorporating an image tracking module according to an embodiment of the present invention.

According to a preferred embodiment of the present invention, a method and apparatus is provided which allows a programmer functioning in a video editing mode to initiate tracking of any image entity or entities in a video stream, after which initiation tracking may be automatic, wherein appropriate coordinate-tracking data associated with the image entity or entities is provided synchronized with the original data stream so that such entities may later be rendered identifiable and interaction-capable to an end user. By image entity is meant any person or thing depicted in a video display, such as a player in a sports game, and actor in a play, a car in a car race, and so on FIG. 1 is a block diagram illustrating an authoring station 11 adapted for accepting a video data stream 16 from a video head end 15 as is known in the art. The original video data source 12 may be any recorded or live source and is not limited as to protocol. Authoring station 11 includes a display 14 and an object tracking module 13 which is adapted to automatically track image entities in a video presentation, and to synchronize the tracking result with the video data stream.

The overall purpose of the authoring station is addition of innovative material to the video data stream, such as text overlay, graphic icons and logos for advertisement, some of which may be associated with identity and address data to allow a viewer at a computerized end station, which may be, for example, a TV terminal with computing capabilities, such as set top boxes, or a computer having TV and/or video playback capability, to access advertisements and other data which may be associated with individual entities in the video presentation. Advertisements may, for example, be associated with a tracked object. Also the text annotations or advertisement logos and the like could either be set to track along with an object, or appear in a fixed position anywhere on the screen, as they are typical in broadcasts today.

In FIG. 1 input data stream 15 to tracking module 13 is a stream of successive bitmapped frames in a normalized resolution, required by the tracking module. The authoring station can be based on virtually any sort of computer platform and operating system, and in a preferred embodiment, a PC station running MS Windows is used, in which case the input stream 16, regardless of protocol, is converted to a digital video format that can be interpreted and played back as a sequence of bitmapped frames. In one preferred embodiment the subject video is displayed typically at 30 frames per second with a resolution of 352 by 240 pixels. In alternative embodiments the frame rate and resolution may be different.

The use and operation of the tracking module is disclosed below in enabling detail, and outputs both the original data stream 19 and an annotation stream, which in this case comprises the data of one or more tracks, being a series of positions for moving entities in the video display. These two streams may be combined (multiplexed) or separately provided to downstream processes and equipment, and other annotations and alterations may be made to the data stream in the authoring station, as described above. Output 21 from authoring station 11 is meant to be a general indication of data output, and not to indicate that there is a single data stream. There may be multiple streams of various protocol.

An authoring station such as station 11 comprises software that may process various media (analog converted to suitable digital or digital) including video presentations or streams, both live and recorded. For example, included video stream types including but not limited to common formats such as Audio Video Interleave (AVI) and Moving Pictures Experts Group (MPEG). Video source 12 may embody any video source that may be known in the art such as a CD-ROM, Satellite TV, cable TV, VCR, Internet Server, Video server, and so on. Video source 12 may provide prerecorded video or live broadcast video. Also, future new formats of video streams shall be considered equivalent in the sense of this invention.

As described briefly above, the inventor has found that a suitable computer platform for performing the tracking process enabled by tracking module 13 is a PC/VDU rnnning Windows™ with a central processing unit (CPU) operating at at least 266 megahertz and having preferably at least 64 megabytes of random access memory (RAM). Video frequency or a frame speed of 30 frames per second (FPS) is utilized in this example as a suitable and compatible standard for processing. The display size of the video picture in this instance is 352×240 pixels, which is a reduced resolution is from that normally displayed in a video presentation on most end use stations, but provides a suitable format for the present tracking process. It will, however, be apparent to the skilled artisan that the example parameters presented herein are not limiting to the success of practicing the present invention. Other video frame speeds, video display sizes, computer platform types and speeds, and software types may be employed in other embodiments of the present invention. The only requirement is that the processor be powerful enough to enable the tracking process at the necessary frame speed and at the necessary video picture resolution.

Tracking module 13 is a software module provided as a component of an editing system in this particular embodiment. Module 13 interfaces with other software components executing on station 11 for the purpose of adding the functionality of the present invention which is the ability to track a moving image entity within a presented video stream.

Tracking module 13 is adapted to determine a pixel signature associated with a visual entity to be tracked in a video display, and then to determine the path of the pixel signature in the display as the path of the image entity to be tracked.

Once the video stream is in the domain of tracking module 13, an image entity in a first bitmap image is selected to be tracked, and further frame-by-frame movement of the image entity is automatically tracked. Tracking data associated with a tracked image entity is associated with the video stream. The first frame is not necessarily the first frame in the video presentation, but the first frame selected by an editor for tracking purposes via a second synchronous data-stream comprising the frame-by-frame coordinates of the tracked image entity. This output video stream comprises the original stream plus the synchronous data stream that contains the tracking data and is illustrated (via directional arrow) as leaving module.

The end result of the tracking process of the present invention is a series of coordinates of the area centroid of a tracking element associated with the image entity selected to be tracked. Through additional editing processes a moving region associated with the image entity in a display may be made to be interactive and identifiable to an end user. User interaction with such an image entity during viewing of a video can be programmed to provide additional network-stored information about that entity to suitable customer premises equipment (CPE) adapted to receive and display the information. Such further information may be displayed, for example, as an overlay on the display of the dynamic video containing the subject image entity. In this way, advertisers, product promoters, or the like may present information to end users based on user interaction with an associated entity in a dynamic video display.

Figure 2:
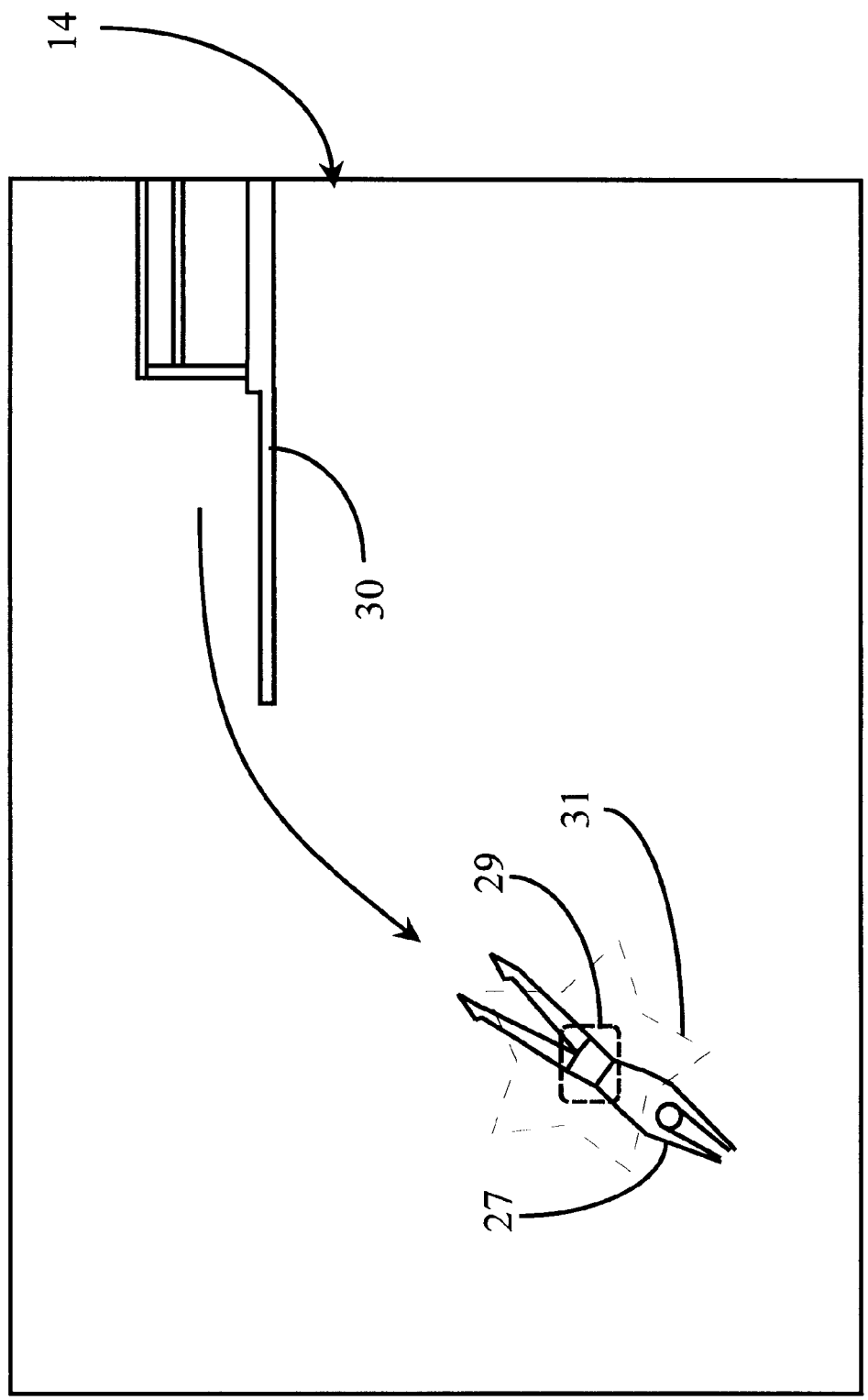
FIG. 2 is an illustration of a display screen depicting a tracked image entity according to an embodiment of the present invention.

FIG. 2 is an illustration of a display screen depicting an image entity 27 to be tracked according to an embodiment of the present invention. PC/VDU display 14 shows a bitmap image stream during the tracking process. Screen 14 is a display screen as viewed by a programmer or editor performing the tracking process.

To begin, an editor selects, typically by well-known cursor technique, a tracking element 29 of pre-selected shape and size, and places (drag-and-drop, click-on etc.) the selected element over an image entity to be tracked, with the center point of the element substantially centered on the image entity to be tracked or at least on a portion of the entity. In a preferred embodiment the editor will have a varied repertoire of sizes and shapes of tracking elements from which to select, which may be displayed in such as a menu bar, as is well-known in the art. In this example, the editor wishes to track a diver 27 from a diving board 30 and into the water below the diving board. The image entity selected for tracking, however, is not the diver per se, but the swim suit worn by the diver, for reasons which will become more clear in the descriptions below. It is logical to assume that tracking, in this embodiment, commenced as diver 27 begins his dive.

A semi-transparent shape 31 defines an area that may be rendered an interactive area linked to the swim suit of diver 27 as might be seen by an end user watching the video. Typically, shape 31 which is in this case the shape of a star, will not be present or seen in screen 14 during the tracking process, but is illustrated here solely for the purpose of discussion, in that through later video editing processes such shapes may be added to an image stream based on the provided information (frame by frame tracking coordinates of the swim suit).

As previously described, as an initiating event, tracking element 29 is placed over an image entity to be tracked, in this case the swim suit and the tracking process is activated via a mouse click or other command action such as may be executed via keyboard input. Upon tracking element 29 being activated the tracking module creates a table or list comprising pixel values associated with a target number and spatial arrangement of pixels (not shown in FIG. 2) associated with tracking element 29. These target pixels are determined in a preferred embodiment by a random (heuristic/statistical) algorithm which is shaded to provide a higher density at and around the centerpoint of the tacking element. The color values for the target pixels are taken from the Video Graphics memory array of the authoring station being used to display the video stream. Specifically, the color (e.g. RGB) values of each target pixel are used as a base comparison signature for tracking element 29 during frame by frame motion (internal frame rate).

Activation of tracking element 29 invokes object tracking module 13 of FIG. 1 and it's subsequent functions. Further detail regarding the unique use of target pixels is described below.

Figure 3:
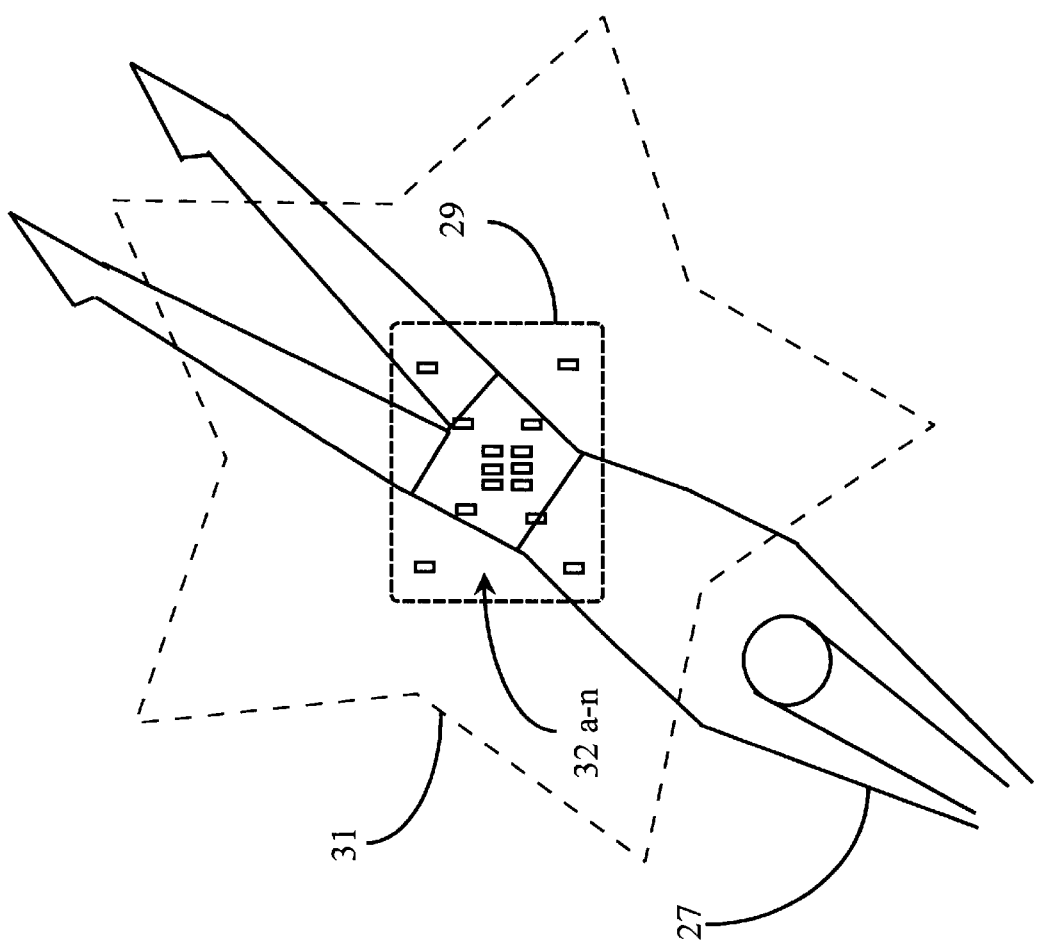
FIG. 3 is an enlarged view of the image entity of FIG. 2 wherein key pixels are visible.

FIG. 3 is an enlarged view of the image entity of FIG. 2 wherein key pixels are shown within the selected tracking element. Tracking element 29 may be any size or shape desired for fitting over an entity selected to be tracked, however a predefined number of target pixels, represented via elements 32a–n, remains substantially constant regardless of size and shape of the tracking element selected. The reason, in this embodiment, for a relatively constant number of pixels is that the process requires an iterative calculation process wherein the values for each signature pixel are involved in calculation at least once for each succeeding frame of the video while the tracking process is running. Since the computing power of the tracking stations remains constant, it is desirable to use a relatively large number of signature pixels (more definitive signature) but not to exceed the computing power of the station.

Although the number of pixels shown in FIG. 3 as signature pixels for exemplary purposes is rather small, and the spacing is indicated as rather regular, there will in reality be a rather larger number of signature pixels associated with a tracking element. In development of working models of the tracking module the number of pixels usable with a high-end PC is from 300 to one thousand. A target number of pixels is determined based on the processing speed of the system and desired accuracy. The number, of course, may vary in various embodiments of the tracking module according to the present invention. It has also been determined that a default arrangement of signature pixels with a higher density toward the center of the tracking element is desirable. With the number of pixels constant, or relatively so, from one tracking element to another, the density will vary according to the areal extent of the tracking element selected.

In a preferred embodiment, as briefly mentioned above, the spatial arrangement of the target pixels is heuristically generated with a higher density toward the center of the tracking element. The randomization may occur before or after an element is selected. In some cases, an editor may select a shape and resize the element before or in the process of placing the element over an entity to be tracked. In such cases the distribution of target pixels may change as the element is resized, and so on. In other embodiments default target pixel formats may be used, and these may be random or regular, depending on several factors.

In this example, tracking element 29 is of the shape of a rectangle having somewhat rounded corners. The center point of tracking element 29 is preferably placed near an apparent center or median point the entity to be tracked. Thus, signature pixels 32a–n are concentrated on the swim suit of the diver to be tracked.

When tracking element 29 is positioned and activated over an image entity to be tracked, in this case the diver's swim suit, a signature table is created and stored as described above. The spatial arrangement of the signature pixels is a known default pattern within the tracking element. Therefore, when the center of the tracking element in a frame is decided (element placed and initiation signaled) the coordinates of the signature pixels relative to the bit mapped frame are easily calculated. Each signature pixel then has a known value for R, G and B from the video memory array for the frame displayed. This base signature is captured for tracking purposes. These values are entered into a base table as described further below.

Figure 4:
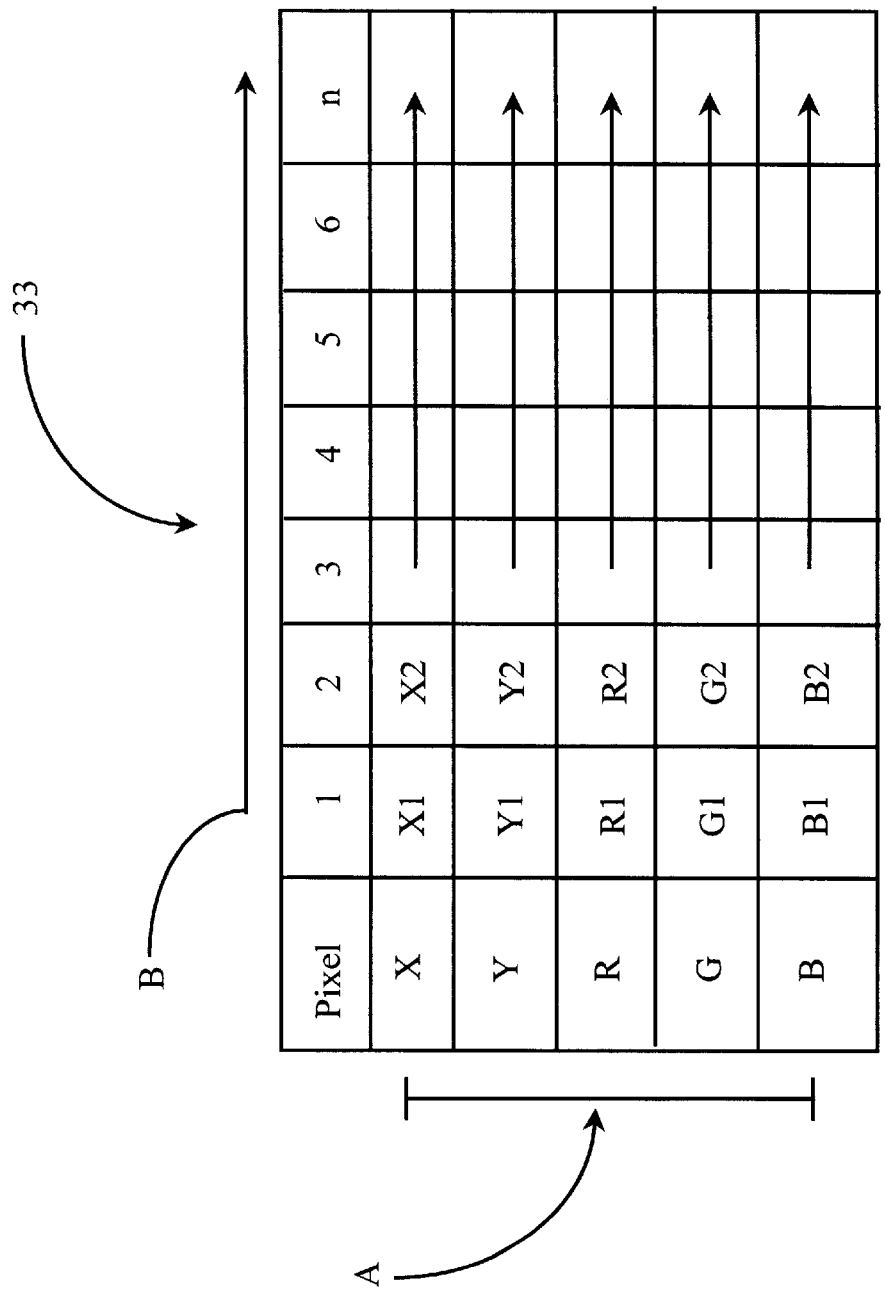
FIG. 4 is a exemplary view of a value table containing values of signature pixels according to an embodiment of the present invention.

FIG. 4 is an exemplary view of a base value table containing values of signature pixels according to an embodiment of the present invention. Value table 33 is created during the initial activation of an image tracking process as described above. Value table 33 contains 5 values per target pixel. A bracketed line A illustrates those 5 values as listed from top to bottom in the first vertical column under Pixel. They are, in order of presentation, X coordinate, Y coordinate (the coordinates are in reference to the areal centroid of the shape of the tracking element), R value, G value, and B value. Cartesian coordinates have been assumed for exemplary purposes, but spherical coordinates, or any other coordinate system may also be used.

Each individual pixel is illustrated serially to the right in table 33 as shown by arrow B with the previously described pixel values presented in vertical columns below. For example, pixel 1 shows values X1, Y1, R1, G1, and B1 in a vertical column below. The next column to the right contains pixel 2 and associated values are identically presented. The numbering scheme, of course may any desirable and workable scheme, as the order of calculation is not fundamental to the invention. The representation of value table 33 as illustrated herein is meant only to be an example of a table for storing values. The values being collected and stored may be kept in any logical order such as in a data list or the like.

Once table 33 is created, in the presently described embodiment it remains the signature table for the specific entity being tracked. For example, using the swim suit, table 33 would reflect the x and y coordinates and the RGB values of the signature pixels within and around the suit at the moment the tracking element is activated.

After table 33 is created and stored, which occurs during the time of a single frame at 30 frames per second in this example, a second frame enters the pipeline of the tracking engine. The pipeline is typically 10 frames, but may be more or fewer frames in other embodiments. In the second frame, or the frame following the frame in which the tracking process is initiated and the signature table is created, it must be assumed that the image entity to be tracked has moved. Since there is no way at this point to know the magnitude and direction (vector) of movement, an image testing process is performed to locate the best match for the image signature.

Typically, in a single frame, an entity, unless moving uncommonly rapidly, will not have moved far. A pattern of assumed center points in an expanding spiral around the original center point of the tracking element is therefore assumed and the test pixel pattern at each assumed center point is taken and compared to the stored base signature. The best match to the stored signature is taken to be the new position of the image entity to be tracked, and the center point for the tracking element is recorded. This spiral testing method is performed at each assumed new image position as is further described below.

Figure 5:
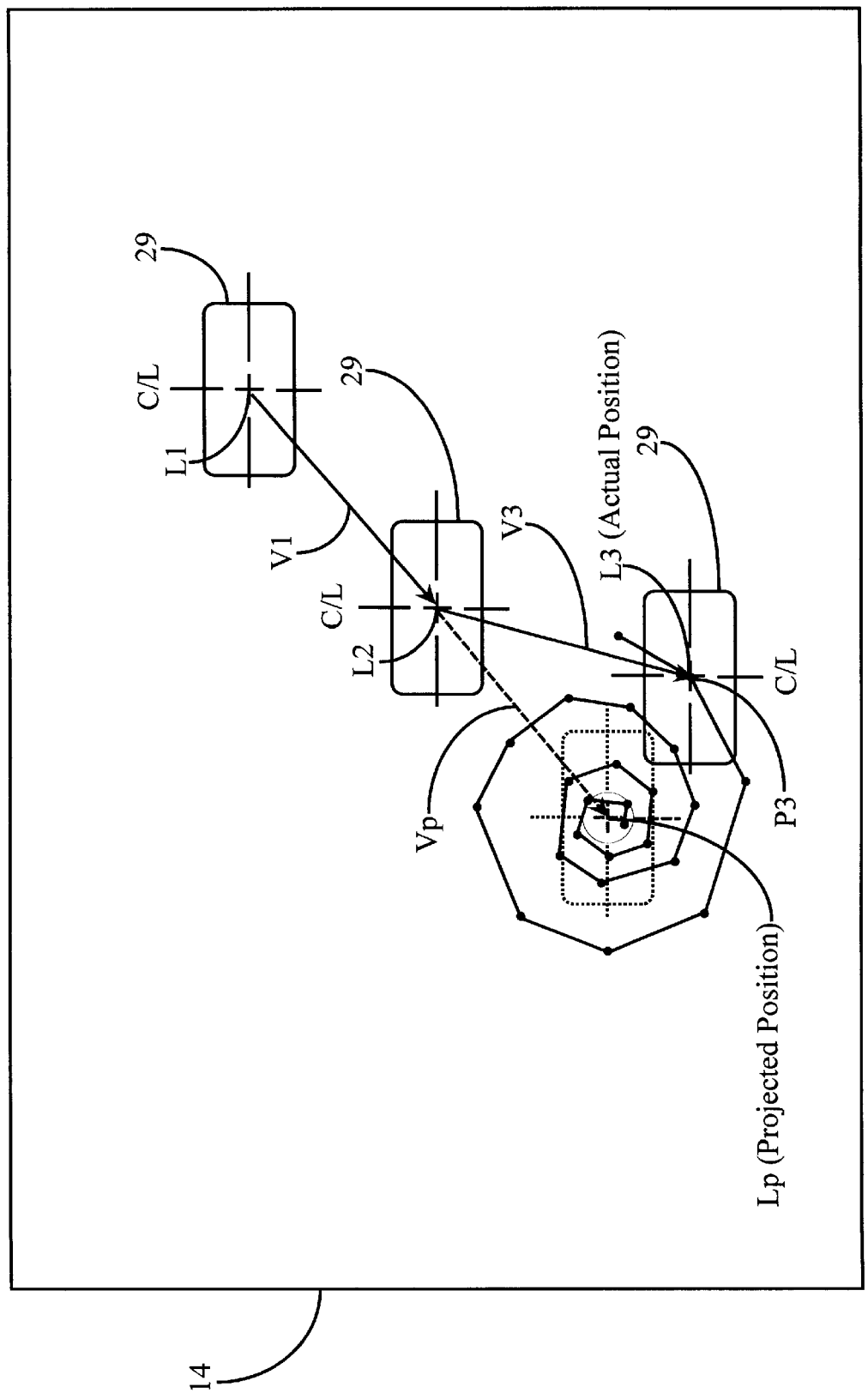
FIG. 5 is a motion diagram illustrating an image tracking process according to an embodiment of the present invention.

FIG. 5 is a motion diagram illustrating an image tracking process according to an embodiment of the present invention. Screen 14 shows a first position L1 of the center point of tracking element 29. This introductory position is the beginning of the tracking process as previously described. L1 has the x and y coordinates of the center point of tracking element 29 at the instant it is placed over an image entity and activated. The image entity itself is not illustrated here for the purpose of simplifying explanation, however, it may be assumed to be present.

In the first iteration the center point tracking element 29 is moved from L1 to L2, shown by vector V1. This first vector is determined by the spiral test pattern as briefly described above, more fully described below. Once this first vector is determined, an assumption is made that a moving entity will typically continue moving in at least nearly the same direction, and at about the same velocity. Therefore, to determine a next assumed position, vector V1 is applied from L2 to determine projected position Lp. At the newly assumed position for the third frame, the spiral pattern test is performed again, and again the best signature match is taken as the correct position for the center point of tracking element 29. The assumed position for the third frame, Lp is now moved to P3, which is found to be the best signature match to the originally stored image signature. At P3 new vector V3 is determined, and V3 is used for the next frame projection.

The process is thus continued from frame to frame, using the last vector as a tool to provide an assumed next position, and then testing that position for accuracy.

In the spiral pattern test, with respect to position Lp, a pattern of 24 points (connected by line segments for illustrative purposes) are illustrated as forming an outward spiral in a counter-clockwise direction from point Lp. A signature comparison is performed at each of the 24 points in order proceeding from Lp, the results are stored, and the best match is found. It will be appreciated by the skilled artisan that the spiral pattern and the order of testing is convenient and not limiting for the invention, as other patterns and orders may well be used.

The unique testing and correcting mechanism in this embodiment is achieved through the use of an algorithm that computes the average root mean square difference of the RGB color values between the colors of the test pixels and the stored signature colors of the target pixels. That is, for each new assumed position, each default pixel position in the test pattern is taken from the video memory array along with R, G and B values. The exemplary root mean square method takes the square root of the sum of the squares of the delta, or deviations, of each pixel color magnitude at each position in the test pattern, sums over all of the pixel pattern, and divides by the number of pixels in the pattern. In this method the best match is determined by the lowest value for the calculation.

The algorithm executes each time a test is conducted for all of the involved test pixels or one time per frame interval, assuming that each iteration is successfully completed in the time of the single frame. If computing time is inadequate, a frame may be skipped. Factors affecting the number of test positions used in an iterative test pattern, such as the spiral position test, include frame speed CPU power, the number of signature pixels used, and so on.

It will be apparent to the skilled artisan that the least mean square method of comparison of color signatures is a convenience, and not a limitation to the invention. There are a variety of ways the color signatures at assumed image entity positions may be compared with the original image entity signature.

In the embodiment herein described all new and assumed positions for tracking element 29 are tested against the originally-stored image. In an alternative embodiment of the invention, at default intervals, the last best signature is assumed as a new base signature, based on the fact that an image entity, such as actor in a video, may move in a way that the image signature may change.

Figure 6:
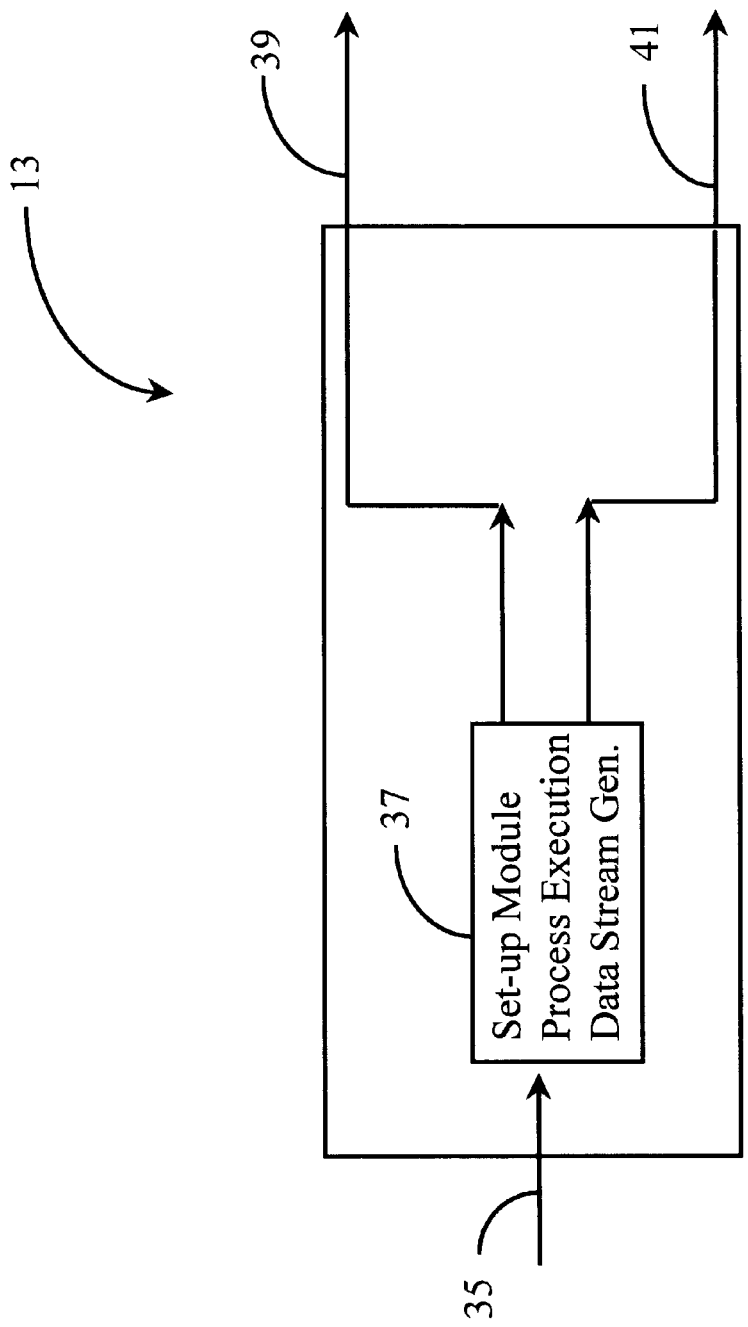
FIG. 6 is a block diagram illustrating a data-stream generator and setup function of the tracking module of FIG. 1 according to an embodiment of the present invention.

FIG. 6 is a block diagram illustrating a data-stream pipeline and set-up function of the tracking module of FIG. 1 according to an embodiment of the present invention. During the tracking process as described above, a separate data stream is created, synchronous to the original video stream, that contains the coordinate data for the center position of tracking element 29 determined in each frame. As previously described with reference to FIG. 1, this output (combining both streams) is directed back to be viewed.

Tracking module 13 takes in the original video stream illustrated herein via a directional arrow (element 35) into a module 37 responsible for set-up, process execution and data-stream generation. Module 37 is capable of working in a ten-frame pipeline with 16, 24, and 32 bit color resolutions. It is important to note here that the parameters of a ten-frame pipeline and 16, 24, and 32 bit resolution capability are exemplary of a preferred embodiment judged by the inventors through empirical method to be adequate for most instances. In other embodiments, other resolutions and frame capacities may be employed.

Set-up includes operations such as pre-selecting tracking element shape and size, pre-selecting number of target and test pixels, and so on. Process execution encompasses initiating and carrying out the automated tracking process including iterative execution of the test algorithm. A data-stream generator produces a data-stream with tracking coordinates for each frame interval which is synchronous to the frame intervals of video stream 35. Although the inventor has chosen to illustrate only one module 37 responsible for three basic functions, it will be apparent to one with skill in the art that three separate modules may be provided with each responsible for one dedicated function.

Two synchronized streams, video stream 39, and data stream 41, are output from tracking module 13. With respect to viewing the tracking process on a display such as screen 14 of FIG. 2, for example, it is desired that there is no visible wavering or other erratic movement of a tracking element such as element 29 of FIG. 2 as this would translate to the end user having an interactive icon or transparent shape that wavers identically when watching the video. Therefore, an additional motion smoothing module may be provided and executed. This module would use known algorithms to judge and correct x and y coordinate positions to obtain a smoother curve or arc in cases wherein image motion is not in a straight line. The requirement of such a module is not needed to practice the present invention, but rather preferred for further refinement of the end product.

In the interactive system described above a first vector was determined by the spiral testing method described. In another embodiment, the editor who selects and places the tracking element on an entity to be tracked may also move the tracking element (drag) along the apparent path of the moving entity, which in this alternative embodiment creates a series of new positions for the tracking element equal to the number of frames over which the editor drags the tracking element. When the editor drops the element, the tracking engine takes over, using the last vector as an assumption for a new position, as described above, and the tracking continues automatically.

It will be apparent to one with skill in the art that those who advertise and promote products or services may utilize the capability as taught by the present invention to create a venue for the promotion of such products or services. For example, a subscriber (end user) to a service specializing in providing video media wherein interactive advertisements are presented may obtained CPE equipment adapted to display, identify, and provide, through interactive device, methods for obtaining additional information regarding image entities. Such interaction may be a simple mouse click on the entity during playback of the video which may invoke a link to a network-based data-server that may deliver the data to the end user via modem connection or the like.

In another embodiment, the method and apparatus taught herein may be used for interactive teaching purposes wherein a highlighted image entity may be clicked on a special display screen causing related information to appear in a second window or screen associated with a plurality of connected devices such as PC/VDU's used by students participating in the session.

It will be apparent to one with skill in the art that through later video editing techniques, a tracked image may have other created images associated with it such as semi-transparent shapes defining interactive regions, information blocks that follow the image, and so on.

It should further be apparent to one with skill in the art that the method and apparatus of the present invention may be practiced on a wide variety of powered computer platforms utilizing a similar variety of viewing software, editing software, and module configuration without departing from the spirit and scope of the present invention. Therefore, the present invention should be afforded the broadest scope and not be limited to the exemplary embodiments as taught herein. The present invention is limited only by the claims that follow.

What is claimed is:

1. A method for tracking a moving entity in a video presentation, comprising steps of:
    (a) selecting, by cursor technique using a pointer device, a tracking element from a plurality of tracking elements of different shapes and sizes available for selection for association with an entity to be tracked, moving and centering the selected tracking element over the entity to be tracked by drag-and-drop technique, and initiating the tracking process by an incremental input at the pointer device in a first frame of a video display comprising a series of bitmapped frames;
    (b) generating a matrix of signature pixels relative to the tracking entity, and initiating a tracking process;
    (c) recording the color values of each of the signature pixels in the first frame, creating thereby a color signature for the entity;
    (d) obtaining a next frame of the video presentation;
    (e) assuming a position for the entity in the next frame;
    (f) testing the color signature at the assumed position and at a plurality of test positions in the immediate vicinity of the assumed position against the color signature recorded for the entity;
    (g) accepting the position with the closest match to the color signature for the entity as the correct position for the entity; and
    (h) repeating steps (c) through (f) to determine positions for the entity in succeeding frames of the video presentation.

2. The method of claim 1 wherein, in step (a), the matrix of signature pixels associated with the tracking element is pre-defined.

3. The method of claim 2 wherein the number of pixels in the predefined matrix of pixels for the plurality of tracking elements available for selection remains substantially the same, but the matrix, including relative distribution in the tracking element, may be different.

4. The method of claim 1 wherein, in step (b), the color values for the signature pixels are placed in an organized table for comparison with later assumed color signatures.

5. The method of claim 1 wherein, in step (d) for the second frame, the assumed position for the entity is the same position as in the first frame.

6. The method of claim 1, wherein in a third and succeeding frames, in step (d) the assumed position is determined by applying a movement vector from the next-to-last preceding frame processed to the last preceding frame processed.

7. The method of claim 1 wherein, in step (e) the plurality of test positions in the immediate vicinity of the assumed position is a series of positions in a spiral pattern processing from the center point of the assumed position.

8. The method of claim 1 wherein the determined center positions of the tracked image entity are provided as a data stream synchronous with the video data stream of the video presentation.

9. A system for tracking a moving entity in a video presentation, comprising:
   a computer station presenting the video presentation on a display as a series of bitmapped frames; and
   a tracking module receiving the video data stream, the tracking module comprising:
      a graphical user interface usable by an editor for selecting a tracking element by cursor technique using a pointer device, from a plurality of tracking elements of different shapes and sizes available for selection for association with an entity to be tracked, moving and centering the selected tracking element over the entity to be tracked by drag-and-drop technique in a first frame of the video presentation, and initiating a tracking process by an incremental input at the pointer device;
      a matrix generation function for generating a matrix of signature pixels relative to the tracking element;
      a determination function for determining the color values of the signature pixels in the first frame and storing the values as an image signature;
      an estimation function for assuming next positions for the moving entity;
      a test function for determining the color signature of the signature pixels at the assumed positions and at a plurality of test positions in the immediate vicinity of the assumed positions against the image signature recorded for the entity; and
      a recording function for accepting the positions wherein the pixel signature most closely matches the image signature as the true positions of the image entity in the next frames.

10. The system of claim 9 wherein each selectable tracking element has a different pre-defined matrix of signature pixels.

11. The system of claim 10 wherein the number of pixels in the predefined matrix of pixels for each of tracking elements available for selection remains substantially the same, but the matrix, including relative distribution in the tracking element, may be different.

12. The system of claim 9 wherein, in the determination function, color values for the signature pixels are placed in an organized table for comparison with later assumed color signatures.

13. The system of claim 9 wherein, in the estimation function, for the second frame the assumed position for the entity is the same position as in the first frame.

14. The system of claim 9 wherein in a third and succeeding frames, in the estimation function the assumed position is determined by applying a movement vector from the next-to-last preceding frame processed to the last preceding frame processed.

15. The system of claim 9 wherein, in the test function, the plurality of test positions in the immediate vicinity of the assumed position is a series of positions in a spiral pattern processing from the center point of the assumed position.

16. The system of claim 9 wherein, in the recording function, the determined center positions of the tracked image entity are provided as a video stream synchronous with the video data stream of the video presentation.

17. A tracking software module comprising:
   an interface for receiving and processing a video data stream while the video presentation provided by the data stream is presented on a display as a series of bitmapped images having a moving image entity to be tracked;
   a graphical user interface usable by an editor for creating or selecting by cursor technique using a pointer device, a tracking element from a plurality of tracking elements of different shapes and sizes available for selection for association with an entity to be tracked, moving and centering the selected tracking element over the entity to be tracked by drag-and-drop technique in a first frame of the video presentation, thereby generating a matrix of signature pixels associated with the entity to be tracked, and for initiating a tracking process;
   a determination function for determining the color values of the signature pixels in the first frame and storing the values as an image signature;
   an estimation function for assuming a next position for the moving entity;
   a test function for determining the color signature of the signature pixels at the assumed position and at a plurality of test positions in the immediate vicinity of the assumed position and testing the determined values against the color signature recorded for the entity;
   a recording function for accepting the position wherein the pixel signature most closely matches the image signature; and
   an output interface for providing a data stream synchronous with the input data stream and having centerpoint coordinates frame-by-frame for the moving entity.

* * * * *